Jan. 24, 1961          W. O. AGAR          2,969,504
FREQUENCY RESPONSIVE CIRCUIT ARRANGEMENTS
Filed Feb. 1, 1956
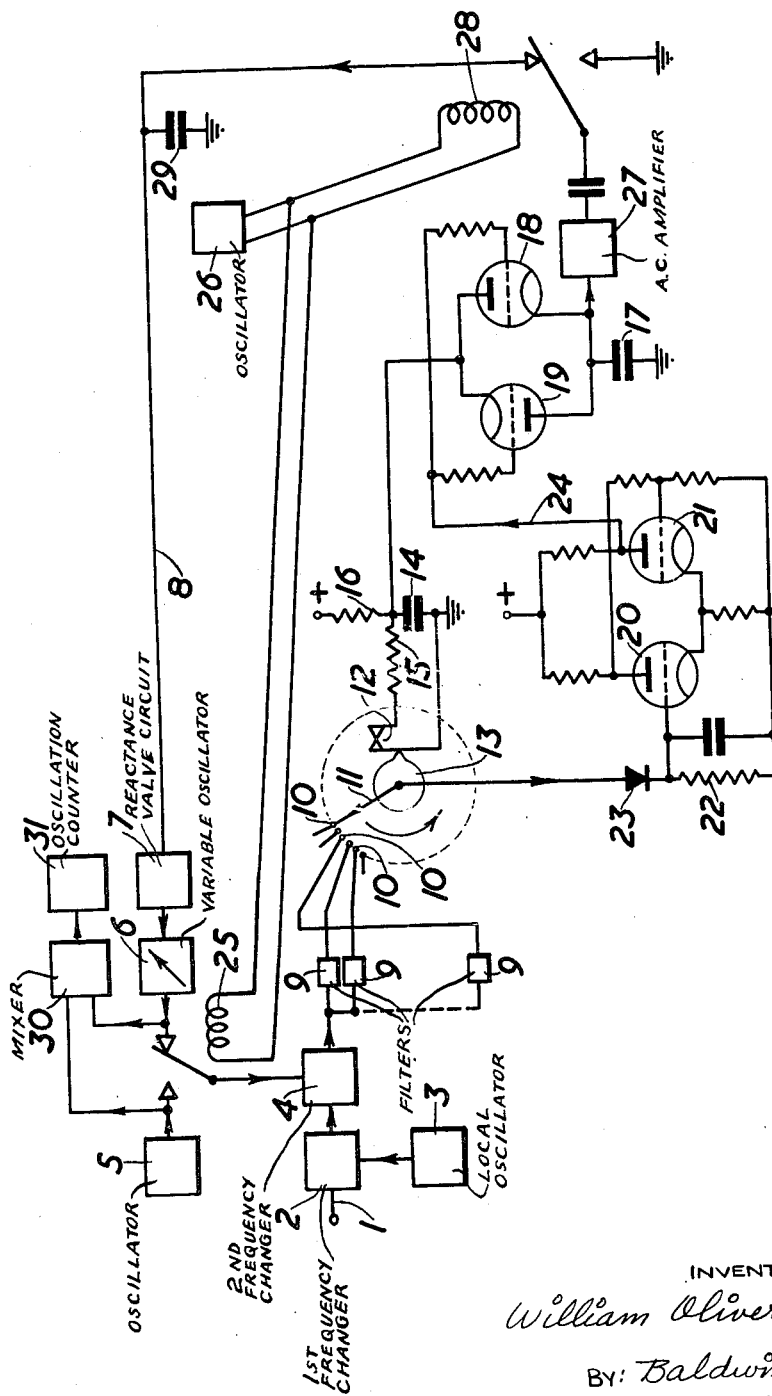
INVENTOR:
William Oliver Agar
BY: Baldwin & Wight
ATTORNEYS

United States Patent Office 2,969,504
Patented Jan. 24, 1961

---

2,969,504

FREQUENCY RESPONSIVE CIRCUIT ARRANGEMENTS

William Oliver Agar, Danbury, England, assignor to Marconi's Wireless Telegraph Company Limited, London, England, a company of Great Britain Filed Feb. 1, 1956, Ser. No. 562,689

Claims priority, application Great Britain Apr. 6, 1955

5 Claims. (Cl. 324—79)

This invention relates to frequency responsive circuit arrangements and has for its object to provide improved circuit arrangements which will be sharply and selectively responsive to a particular frequency present in a band of frequencies which may include a good deal of noise.

There is a number of radio navigational aiding systems and radar systems in which it is necessary accurately to measure a Doppler frequency produced by a moving radio reflecting object. For example, in certain continuous wave radar systems a moving object is "illuminated" by a narrow transmitted beam and the speed of movement of the object towards or away from the system ascertained by measuring the Doppler frequency produced by that movement. In other systems it is required to operate certain controls automatically in dependence on the relative speed of movement of the reflecting object and therefore on the Doppler frequency. In practice, however, it is exceedingly difficult to measure Doppler frequencies or to produce control response in dependence thereon with the desired high degree of accuracy. It will be appreciated that, in general, owing to the roughness of surface and irregularity of shape of a radio reflecting object which might be, for example, on aircraft, or the ground and owing to the finite width of the "illuminating" radio beam which scans across said object, a precise definite Doppler frequency is not obtained but instead the Doppler frequency is in effect spread over a band the width of which may easily be as much as 10% of the value of the mean frequency of that band. What it is required to do in general is to measure that mean frequency but it will be readily understood that this is exceedingly difficult to do especially if, as is usually the case, the "spread" Doppler frequency band is accompanied by receiver and other noises of comparable amplitude.

The present invention seeks to enable problems such as the foregoing to be solved and frequencies present in narrow bands of frequencies to be measured or otherwise responded to with high accuracy even in the presence of considerable noise.

According to this invention a preferred form of circuit arrangement adapted to be responsive to input signals of any frequency within a pre-determined band of frequencies comprises a frequency changer; means for applying input signals to said frequency changer; a plurality of filters each sharply responsive to a different frequency within a second band of frequencies of substantially the same width as said first band; means for applying the output of said frequency changer to said filters; a pair of oscillation sources one of a frequency approximately equal to the difference of the mean frequencies of the two bands, and the other of a frequency, approximately equal to the sum of said mean frequencies at least one of said sources being variable in frequency; means for cyclically and successively sampling outputs from the individual filters in said plurality of filters; a source of potential cyclically varying in synchronism with the cycle of sampling; means responsive to increase in the output of any of said filters above the average of the outputs from all said filters for connecting said potential source to a condenser to charge the same to a voltage characteristic of the filter providing said higher output; means for alternately connecting the two oscillation sources to provide the second input to said frequency changer; means synchronously actuated with said last mentioned means for varying the frequency of the variable frequency oscillation source in dependence upon the charge in said condenser to make the frequency of the output from said frequency changer the same when said variable frequency oscillation source is connected thereto as when the other oscillation source is connected thereto; and means responsive to a combination of the frequencies of the two oscillation sources.

Preferably the means responsive to a combination of the frequencies of the two oscillation sources is a counter connected to count a beat frequency produced by beating the oscillations of the two sources together.

Preferably the cyclically varying potential source is a sawtoothed wave source of the same frequency as that of the sampling cycle and preferably also the means responsive to increase in the output of a filter above the average output is an amplitude-change-responsive trigger circuit arranged to close an electronic switch connecting said potential source to the condenser.

Preferably again the voltage across the condenser is utilised intermittently to charge a further condenser by means of a relay switch synchronously actuated with another relay switch arranged alternately to connect the two oscillation sources to the frequency changer, the voltage across said second condenser being utilised as an automatic frequency controlling voltage for the variable frequency oscillation source.

The invention is illustrated in the accompanying drawing which shows diagrammatically one embodiment thereof. In describing the drawing, specific frequency values will be given, but it is to be understood that these are exemplary only, and in no sense limiting.

Referring to the drawing, input signals, for example Doppler frequencies which may be expected to be present within a band of 0–10 kc./s., are applied at 1 to a first frequency changer 2 of any convenient known type whose second input is provided by a local oscillator 3 of 210 kc./s. The frequency changer 2 is simply for the purpose of raising the possible input band of 0–10 kc./s. to a value (210–220 kc./s.) which is more convenient to handle. The apparatus now being described is required to measure a mean Doppler frequency which may be present in the input signals applied at 1 and may be presumed to have a band width of 500 c./s., i.e. the accuracy of measurement is required to be within 500 c./s. defined.

The output from the frequency changer 2 is applied to a second frequency changer 4 whose second input is derived alternately from two further oscillators 5 and 6, of which at least one (as shown the oscillator 6) is variable in frequency the variation being secured by a reactance valve circuit 7 in dependence upon a D.C. potential applied to it over a lead 8. Automatic frequency control arrangements of this kind in which the frequency of an oscillator is varied by including therein a reactance manifested by a thermionic valve in turn controlled by a D.C. potential are well known per se and receive no description here.

The oscillators 5 and 6 are selected to be of such frequencies that the difference between a frequency within the output band from the frequency changer 2 and the frequency of one oscillator is approximately equal to the difference between the frequency of the other oscillator and said output band frequency. The output band of frequencies from the frequency changer 4 is fed to a plurality of sharply selective resonant filters 9 which together cover that band and have their inputs in parallel.

To quote practical figures, the local oscillator 5 may have a frequency of 130 kc./s. and the local oscillator 6 may be variable over the range 290–310 kc./s. With these values the plurality of filters 9 may cover a frequency band of 80–92 kc./s. Only three filters 9 are shown but in practice there might be 120 with different resonant frequencies equally spaced at 100 c./s. over the band 80–92 kc./s. each filter having a band width of 20 c./s.

The outputs from the filters are taken each to a separate electrode 10 of a rotary sampling capacity switch (shown diagrammatically as an ordinary switch) whose armature 11 is rotated over the ring of electrodes 10 at a convenient desired frequency, for example 110 c./s. In other words, with a sampling switch as shown, the armature 11 would make 110 revolutions per second and would therefore provide a sampling frequency of 110 c./s.

A saw-tooth wave of voltage of 110 c./s. is generated in synchronism with the sampling cycle. As shown, this is accomplished by means of a pair of contacts 12 which are momentarily closed once per revolution of the armature 11 by means of a cam 13. When these contacts close they discharge a condenser 14 through a limiting resistance 15 the said condenser 14 charging substantially linearly at other times through a resistance 16. There is thus produced across the condenser 14 a saw-tooth voltage wave whose instantaneous voltage is characteristic of the particular filter 9 with which, at that moment, the armature 11 is in circuit since the value of the charge upon condenser 14 is mechanically related to the position of contact arm 11, contact 12 being arranged to open at a predetermined position of said arm and the condenser commencing to charge through resistance 16 from the time that said position is reached and until contact 12 is again closed by the cam 13 at a second predetermined position of said arm. The voltage across the condenser 14 is utilised to charge a further condenser 17 to a value dependent upon that voltage at any time through what can be regarded as an electronic switch comprising the valves 18 and 19 which are connected back-to-back and normally provide no conductive path through which to charge the condenser 17, i.e. normally the "switch" is open. If, however, the output from any of the filters 9 rises above the average output from all the filters, a trigger circuit is actuated and closes the electronic switch. This trigger circuit, which is well known per se, includes two valves 20 and 21 connected as shown. In the grid circuit of the valve 20 is a condenser-leak resistance combination 22 and the said grid is fed from armature 11 through a rectifier 23. The valve 20 is normally cut-off and the valve 21 is normally conductive. If however, the input to the valve 20 rises above the average input thereto—that is to say, if the output from any particular filter in the series being sampled is substantially higher than the average from all the filters the valve 20 changes over to the conductive state, the valve 21 cuts off and a pulse is applied from the anode of the last mentioned valve through the lead 24 to the grids of the valves 18, 19 so as momentarily to close the electronic switch. At this instant therefore the condenser will charge to a value dependent upon the voltage at that time across the condenser 14. In practice, with Doppler frequencies and filters and oscillators of the values herein given, the electronic switch would close during sampling of perhaps three adjacent filters of which the centre filter would of course give the largest output, all three filters giving an output well above the average output.

The local oscillators 5 and 6 are, as already stated, alternately connected to the frequency changer 4, alternation being effected by a relay switch whose operating coil 25 causes the alternation to take place at, for example, a frequency of 5 per second, the actuating frequency being produced by any convenient oscillator 26. The output from the condenser 17 after amplification in an A.C. amplifier 27 capable of amplifying at very low frequencies, is fed to the armature of a second relay switch actuated in synchronisation with the first and having its operating coil 28 in parallel with the coil 25. In one position of the second relay switch the output from the amplifier 27 is earthed and in the other it is applied to charge a condenser 29 whose voltage is fed over lead 8 to act as the reactance controlling voltage of the automatic frequency controlling reactance valve 7.

It will be seen that this circuit arrangement will automatically adjust itself until the alternation of connection of the oscillators 5 and 6 to the frequency changer 4 produces no change in the frequency of the output from said frequency changer. If there is a change in the frequency of this output when one oscillator is replaced by the other the moment of closing of the electronic switch will change, the charge in the condenser 17 will change and the relay switch into which the amplifier 27 feeds—this relay switch is, in effect, a phase sensitive detector—will produce a change in the charge on the condenser 29 in such a direction as to alter the frequency of the oscillator 6 until the stable condition (when change-over of local oscillator produces no effect) is reached. When this stable condition is reached the beat frequency, i.e. the sum or difference frequency of the oscillators 5 and 6 will be a direct measure of the mean input Doppler frequency. Since the oscillators 5 and 6 are local oscillators which may easily be made of good amplitude and very low noise level none of the difficulties which would be experienced in seeking to measure a noise-masked mean Doppler frequency are experienced in measuring the beat-frequency. As shown and most conveniently this beat frequency may be measured by applying oscillations from the two oscillators 5 and 6 to a mixer 30 whose output is fed to any convenient known oscillation counter 31, so that by reading counter 31 over a period of time direct measurement is obtained.

I claim:

1. A circuit arrangement adapted to be responsive to input signals of any frequency within a pre-determined band of frequencies comprising a frequency changer; means for applying input signals to said frequency changer; a plurality of filters each adapted to be sharply responsive to a different frequency within a second band of frequencies of substantially the same width as said first band; connecting means for applying the output of said frequency changer to said filters; a first oscillation source adapted to produce a frequency approximately equal to the difference of the mean frequencies of the two bands, a second oscillation source adapted to produce a frequency approximately equal to the sum of said mean frequencies at least one of said sources being variable in frequency; sampling means adapted to sample cyclically and successively the outputs from the individual filters in said plurality of filters; a source of cyclically varying potential adapted to vary cyclically in synchronism with the cycle of sampling; means adapted to respond to increase in the output of any of said filters when said increase is above the average of the outputs from all said filters; a condenser connected to said potential source through said last mentioned means whereby said condenser is charged to a voltage characteristic of the filter providing said higher output; connecting means for alternately connecting the two oscillation sources to provide the second input to said frequency changer; means synchronously actuated with said last mentioned means and adapted to vary the frequency of the variable frequency oscillation source in dependence upon the charge in said condenser and to make the frequency of the output from said frequency changer the same when said variable frequency oscillation source is connected thereto as when the other oscillation source is connected thereto; and means responsive to a combination of the frequencies of the two oscillation sources.

2. A circuit arrangement as claimed in claim 1 wherein the means responsive to a combination of the frequencies of the two oscillation sources is a counter connected to count a beat frequency produced by beating the oscillations of the two sources together.

3. A circuit arrangement as claimed in claim 1 wherein the cyclically varying potential source is a saw-tooth wave source of the same frequency as that of the sampling cycle.

4. A circuit arrangement as claimed in claim 1 wherein the means responsive to increase in the output of a filter above the average output is an amplitude-change-responsive trigger circuit arranged to close an electronic switch connecting said potential source to the condenser.

5. A circuit arrangement as claimed in claim 1 wherein the voltage across the condenser is utilised intermittently to charge a further condenser by means of a relay switch synchronously actuated with another relay switch arranged alternately to connect the two oscillation sources to the frequency changer, the voltage across said second condenser being utilised as an automatic frequency controlling voltage for the variable frequency oscillation source.

References Cited in the file of this patent

UNITED STATES PATENTS

| | | |
|---|---|---|
| 2,530,693 | Green | Nov. 21, 1950 |
| 2,558,100 | Rambo | June 26, 1951 |
| 2,627,033 | Jensen | Jan. 27, 1953 |
| 2,790,905 | Wright | Apr. 30, 1957 |
| 2,866,090 | Sherr | Dec. 23, 1958 |
| 2,896,074 | Newsom | July 21, 1959 |